United States Patent
Miyamoto

(10) Patent No.: US 6,511,286 B2
(45) Date of Patent: Jan. 28, 2003

(54) CENTRIFUGAL BLOWER AND PORTABLE POWER WORKING MACHINE

(75) Inventor: Junichi Miyamoto, Togane (JP)

(73) Assignee: Maruyama Mfg. Co., Inc., Tokyo (JP)

( * ) Notice: Subject to any disclaimer, the term of this patent is extended or adjusted under 35 U.S.C. 154(b) by 0 days.

(21) Appl. No.: 09/793,670

(22) Filed: Feb. 26, 2001

(65) Prior Publication Data

US 2001/0021344 A1 Sep. 13, 2001

(30) Foreign Application Priority Data

Mar. 10, 2000 (JP) ........................................ 2000-067272

(51) Int. Cl.⁷ .............................................. F04D 29/66
(52) U.S. Cl. ....................... 415/191; 415/119; 415/185; 415/121.2; 415/208.2; 415/210.1; 416/247 R; 15/326
(58) Field of Search ................................ 415/119, 185, 415/191, 208.2, 210.1, 204, 206, 121.2; 416/247 R; 15/326

(56) References Cited

U.S. PATENT DOCUMENTS

| | | | |
|---|---|---|---|
| 2,305,136 A | * 12/1942 | Campbell | ................... 415/185 |
| 2,950,859 A | * 8/1960 | Kirk | ............................ 415/119 |
| 4,325,163 A | * 4/1982 | Mattson et al. | .......... 415/121.2 |
| 4,756,668 A | * 7/1988 | Gassen et al. | .......... 416/247 R |
| 4,913,112 A | * 4/1990 | Iida | ............................. 415/206 |
| 5,131,352 A | * 7/1992 | Hoshino et al. | ........ 416/247 R |
| 5,259,726 A | * 11/1993 | Bacria | ......................... 415/119 |
| 5,460,485 A | * 10/1995 | Sugiyama et al. | ....... 415/208.2 |
| 6,017,191 A | * 1/2000 | Harmsen | ................. 416/247 R |

FOREIGN PATENT DOCUMENTS

JP 1-159498 A * 6/1989 .............. 415/208.2

* cited by examiner

*Primary Examiner*—Christopher Verdier
(74) *Attorney, Agent, or Firm*—Rosenthal & Osha L.L.P.

(57) ABSTRACT

A centrifugal blower comprises an impeller; and a casing, having an intake port disposed at a region opposing the air inlet portion of impeller, for accommodating the impeller. The casing is provided with a port cover constituted by rod-shaped members which are arranged in a net structure, in order to cover the intake port of casing. A trailing edge portion of the rod-shaped members is formed with a slanted surface. Due to this slanted surface, the flow of air passing through the port cover so as to flow into the air inlet portion is smoothly deflected away from the axis of rotation of impeller. As a consequence, swirls are restrained from occurring, whereby a sound-insulating effect is exhibited.

10 Claims, 17 Drawing Sheets

CENTRIFUGAL BLOWER AND PORTABLE POWER WORKING MACHINE

BACKGROUND OF THE INVENTION

1. Field of the Invention

The present invention relates to a portable power working machine having a centrifugal blower, such as a backpack blower apparatus or power duster; and, more particularly, is concerned with a technique for reducing the noise of a centrifugal blower.

2. Related Background Art

Known as a portable power working machine is one equipped with a centrifugal blower, such as a backpack blower apparatus or power duster. In general, the centrifugal blower used in such a portable power working machine has an intake port provided with a port cover in order to prevent foreign matters from being drawn into the centrifugal blower or hands, clothes, and the like of users from carelessly or accidentally entering the blower.

A typical conventional cover has a net structure in which a plurality of rod-shaped members are combined like a web or lattice (see FIG. 4). FIG. 16 is a sectional view partly showing a conventional port cover 1. As shown, each of rod-shaped members 2, 3 has a substantially rectangular cross-sectional form, whereas their longer sides are arranged substantially in parallel with the air passing direction in the state where the cover 1 is attached to the centrifugal blower. Consequently, the leading and trailing edge portions 4 of rod-shaped members 2, 3, i.e., the shorter sides 4 of their cross sections, are arranged substantially perpendicular to the air passing direction. FIG. 17 is a sectional view partly showing another conventional port cover 5. In the port cover 5 of FIG. 17, trailing edge portions 8 of rod-shaped members 6, 7 are rounded into a semispherical form.

In a portable power working machine provided with the port cover 1 or 5 mentioned above, noise is generated from parts surrounding the port cover 1 or 5 when driving the centrifugal blower.

Therefore, it is an object of the present invention to provide a centrifugal blower yielding low noise, and a portable power working machine equipped with such a centrifugal blower.

SUMMARY OF THE INVENTION

The inventors have carried out various studies in order to achieve the above-mentioned object and, as a result, have found that, due to the presence of a port cover, a large turbulent flow or swirl occurs on the downstream side of the port cover, i.e., in the center part within the centrifugal blower, thereby causing noise. Also, the inventors have found that a flow of air having flowed into the centrifugal blower from the intake port along the axis of rotation of an impeller is deflected radially outward within the blower, thus becoming one of causes for generating the swirl.

Hence, the present invention provides a centrifugal blower comprising an impeller having a plurality of blades arranged in a circumferential direction and an air inlet portion surrounded by the blades; a casing for accommodating the impeller, the casing having an intake port disposed at a region opposing the air inlet portion of the impeller; and a port cover, disposed in the casing, for covering the intake port, the port cover comprising a plurality of rod-shaped members arranged in a net structure; wherein at least one of the plurality of rod-shaped members is configured such that an airflow passing through the port cover so as to flow into the air inlet portion is deflected away from an axis of rotation of the impeller.

The air drawn into the centrifugal blower changes the direction of its flow away from a direction extending along the axis of rotation of the impeller, i.e., into a radially outward direction. Since the rod-shaped members function so as to assist in this deflection, the air smoothly changes the direction of its flow after passing through the port cover, so that swirls or turbulences are restrained from occurring on the downstream side of the port cover, whereby noise is reduced.

The port cover may be constituted by a combination of a plurality of concentrically arranged annular rod-shaped members with a radially extending rod-shaped member.

In this case, it will be effective if a trailing edge portion of the annular rod-shaped member has an inner face which forms a slanted surface inclining outward as it advances in the air passing direction. This slanted surface exhibits the deflecting effect.

It will similarly be effective if both sides of the trailing edge portion of the radially extending rod-shaped member form a slanted surface such that the trailing edge portion becomes thinner as it advances in the air passing direction.

If a trailing edge portion of one of the plurality of annular rod-shaped members is projected downstream the trailing edge portion of the rest of the plurality of annular rod-shaped members in the air passing direction, then the airflow in the air inlet portion can be held stably, whereby swirls can be restrained from occurring.

The amount of downstream projection in the trailing edge portion of the rod-shaped member in the air passing direction may vary in a direction in which the rod-shaped member extends. In this configuration, the leading edge of the rod-shaped member becomes irregular, for example, so that the positions or times at which swirls occur may vary, whereby the swirls are kept from growing.

The present invention is also directed to a portable power working machine having the centrifugal blower mentioned above. The portable power working machine includes a backpack blower apparatus.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DESCRIPTION OF THE PREFERRED EMBODIMENTS

In the following, preferred embodiments of the present invention will be explained with reference to the drawings, among which parts identical or equivalent to each other will be referred to with numerals identical to each other.

Figure 1:
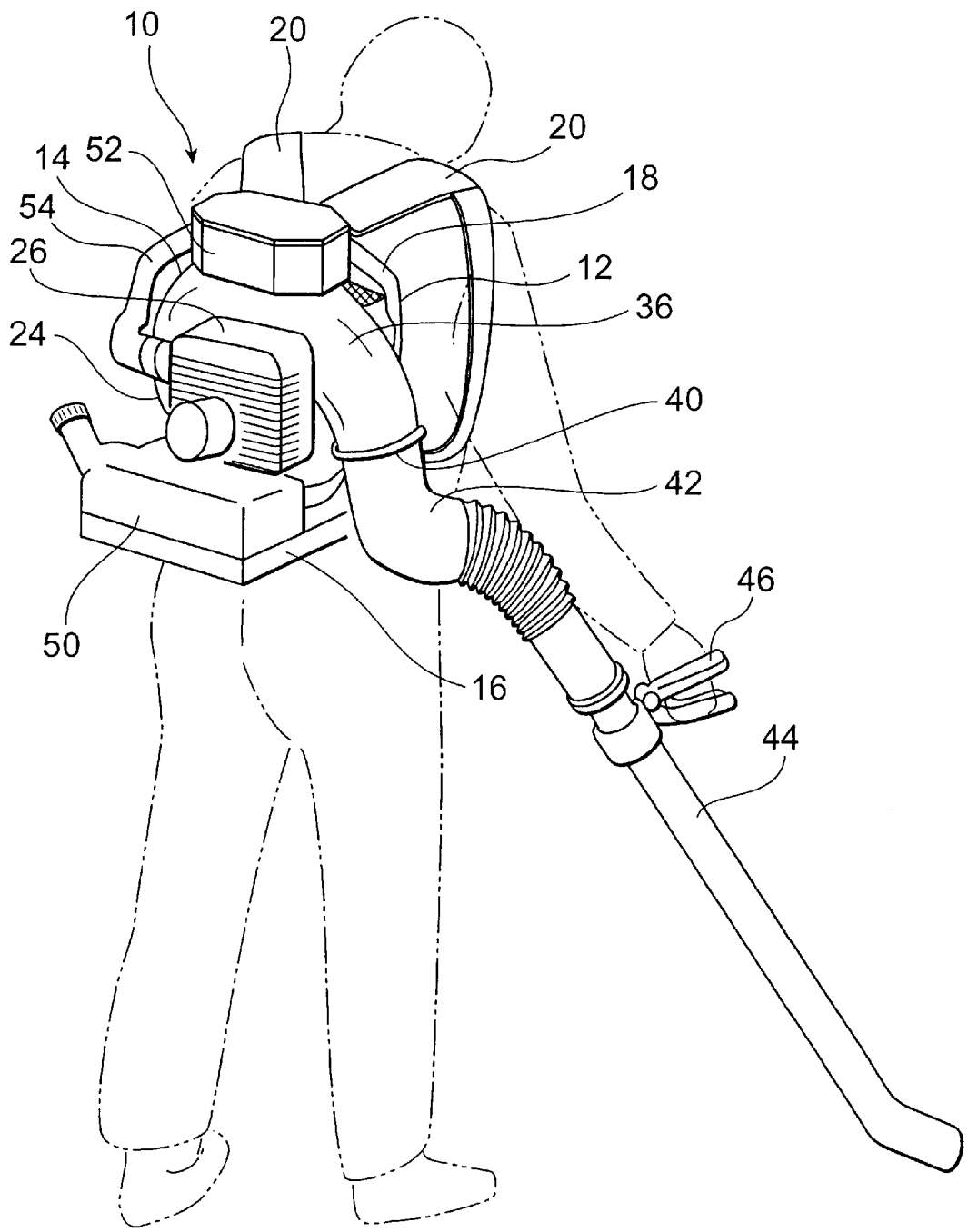
FIG. 1 is a view showing a state of use of a backpack blower apparatus which is a type of the portable power working machine in accordance with the present invention.
Figure 2:
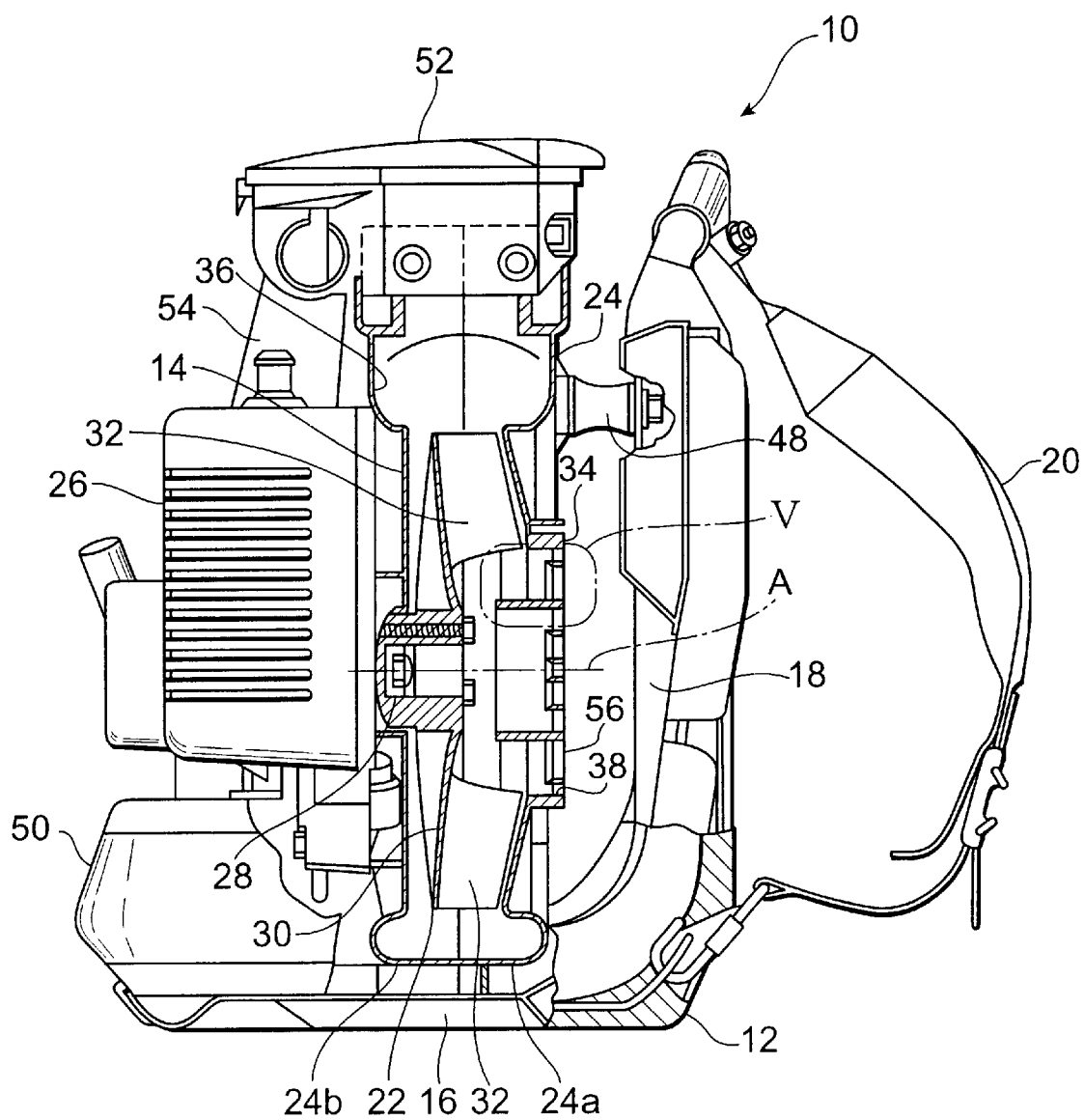
FIG. 2 is a side view showing a blower apparatus of the present invention in a partly cutaway state.

FIGS. 1 and 2 show a backpack blower apparatus 10 in accordance with the present invention. The backpack blower apparatus 10 is a portable blower apparatus of a type employed for collecting fallen leaves, cut grass, and wastes at a desirable location by jetting out air, and so forth. The shown blower apparatus 10 has a backpack frame 12 to be carried on the back of an operator or user, and a centrifugal blower 14 of the present invention attached to the backpack frame 12.

The backpack frame 12 is formed by an L-shaped frame having a horizontal portion 16 and an upright portion 18 erecting substantially perpendicularly from one end of the horizontal portion 16. The upright portion 18 is formed such that the back of the operator or user comes into contact therewith. Two shoulder bands 20 are attached to the backpack frame 12 such that the operator or user can carry the backpack frame 12 on the back. In a normal state of use in which an erect operator carries the backpack frame 12 on the back, the upright portion 18 extends substantially vertically, whereas the horizontal portion 16 extends substantially horizontally away from the back of the operator. In this specification, based on this state of use, the direction in which the horizontal portion 16 extends is defined as rearward for convenience, and words such as "upper," "lower," "front," "left," and "right" will be used accordingly.

As clearly shown in FIG. 2, the centrifugal blower 14 has an impeller 22, and a casing 24 for accommodating the impeller 22. The impeller 22 is constituted by a disk-shaped hub plate 30 connected to a rotary shaft 28 of an internal combustion engine 26, which is a driving source for the centrifugal blower 14, and a plurality of blades 32 integrally disposed on one surface of the hub plate 30 at equally spaced angular intervals in its peripheral direction. The inner end part of each blade 32 is disposed at a predetermined distance from the axis of rotation A of the impeller 22, whereas the space surrounded by the inner ends of blades 32 functions as an air inlet portion 34.

The casing 24 comprises two halves 24a, 24b, which are preferably molded from a resin, and has a portion for accommodating the impeller 22 and a helical portion 36 disposed adjacent thereto on the radially outside. One casing half 24a is formed with a circular opening 38 at the center part thereof. This opening 38 is concentric with the axis of rotation A of the impeller 22. The opening 38 functions as an intake port communicating with the air inlet portion 34. The internal combustion engine 26 is disposed on the outer face side of the other casing half 24b. The helical portion 36 of casing 24 gradually increases its flow area toward its outlet 40. An air injection tube 44 is connected to the outlet 40 of helical portion 36 by way of a flexible pipe 42. The tube 44 is provided with a handle 46 which is held by the operator in order to adjust the direction of the tip portion of tube 44.

Thus configured centrifugal blower 14 is attached to the backpack frame 12 such that the casing half 24a having the intake port 38 opposes the upright portion 18 of backpack frame 12 with a predetermined gap therebetween. Preferably, the lower portion of centrifugal blower 14 is secured to the horizontal portion 16 of backpack frame 12, whereas the upper portion thereof is supported by the upright portion 18 of backpack frame 12 by way of a vibration absorbing member, such as a rubber mount 48, for example. The rubber mount 48 absorbs the vibration from the internal combustion engine 26 and centrifugal blower 14, and keeps the gap between the upright portion 18 of backpack frame 12 and the centrifugal blower 14.

Fuel for driving the internal combustion engine 26 is stored in a fuel tank 50 attached to the engine 26 on the lower side thereof on the horizontal portion 16 of backpack frame 12. Also, an air cleaner 52 for cleaning the air is secured to the upper portion of centrifugal blower 14, whereby the air cleaned by the air cleaner 52 is introduced to the carburetor (not shown) of engine 26 by way of a connecting pipe 54.

If the internal combustion engine 26 is driven so as to rotate the impeller 22 of the centrifugal blower 14 in thus configured blower apparatus 10, then an air attraction force is generated in the air inlet portion 34 within the centrifugal blower 14, whereby the air surrounding the blower apparatus 10 passes between the centrifugal blower 14 and the upright portion 18 of backpack frame 12, so as to be drawn from the intake port 38 into the air inlet portion 34 within the centrifugal blower 14. The impeller 22 sends thus drawn air through the casing 24 away from the axis A, i.e., radially outward, so that the air is blown out of the air injection tube 44 by way of the helical portion 36 and flexible pipe 42.

While the blower apparatus 10 is driven, foreign matters such as fallen leaves can be drawn therein as the air is inhaled by the centrifugal blower 14. Also, it is necessary to keep hands and clothes of operators and the like from carelessly or accidentally entering the centrifugal blower 14. Therefore, the intake port 38 of centrifugal blower 14 is provided with a port cover 56.

Figure 3:
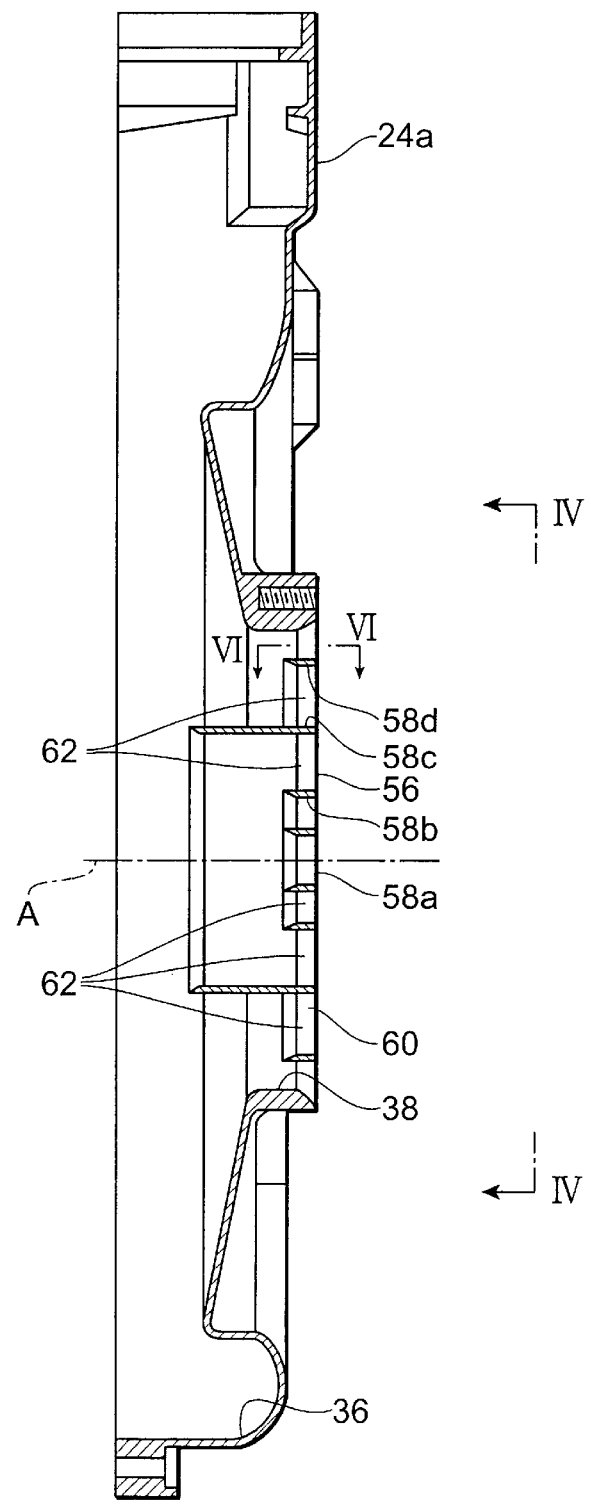
FIG. 3 is a vertical sectional view showing a front-side casing half in the blower apparatus of FIG. 2.
Figure 4:
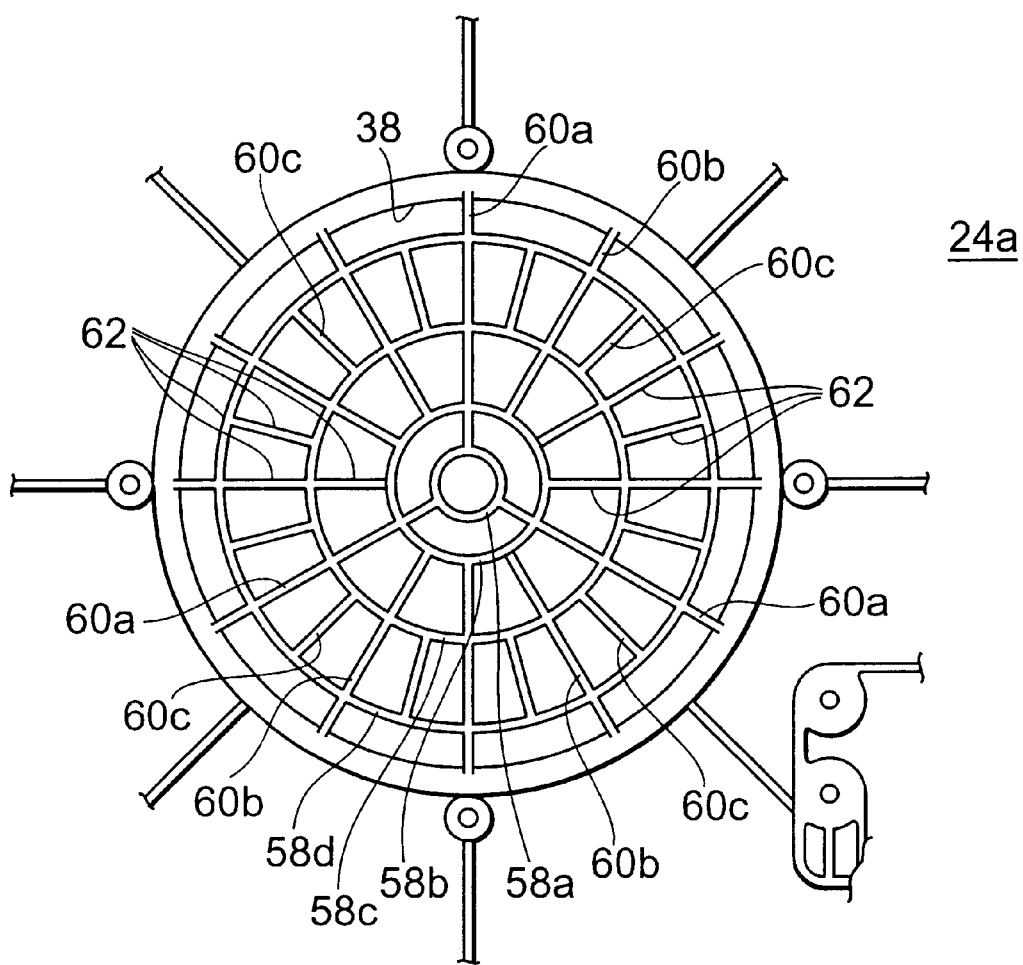
FIG. 4 is a view as seen along the line IV—IV of FIG. 3.

As shown in FIGS. 3 and 4, the port cover 56 of this embodiment is integrally formed with the front-side casing half 24a as a part thereof. The port cover 56 is constituted by a plurality of annular rod-shaped members 58 arranged concentric with the circular inner periphery of the casing half 24a defining the intake port 38, and a plurality of radially extending rod-shaped members 60 for holding these ring members 58 against each other and/or against the casing half 24a. The ring members 58 and radial members 60 form a web-like net structure, thereby defining a plurality of openings 62. These openings 62 function as air passing portions which allow air to flow into the centrifugal blower 14 from the outside thereof. It will be effective if the arrangement pattern of rod-shaped members 58, 60 is defined such that each air passing portion 62 has substantially the same area. In the shown embodiment, the port cover 56 has, successively from the center side, a first ring member 58a, a second ring member 58b, a third ring member 58c, and a fourth ring member 58d. The radial members include 3 members 60a extending from the first ring member 58a to the inner periphery of casing half 24a, 9 members 60b extending from the second ring member 58b to the inner periphery of casing half 24a, and 12 members 60c extending from the third ring member 58c to the fourth ring member 58d, which are arranged at equally spaced intervals in the circumferential direction.

Each ring member 58 is shaped substantially as a cylinder extending in a direction parallel to the axis of rotation A of the impeller 22. An edge portion 59 of each ring member 58 on the downstream side in the passing direction of the air flowing into the centrifugal blower 14 from the outside, i.e., trailing edge portion 59, is formed with a conical slanted surface 64 on the inner face side as clearly shown in FIG. 5. In other words, the inner diameter of the trailing edge portion of each ring member 58 gradually increases as it advances in the air passing direction.

Figure 6:
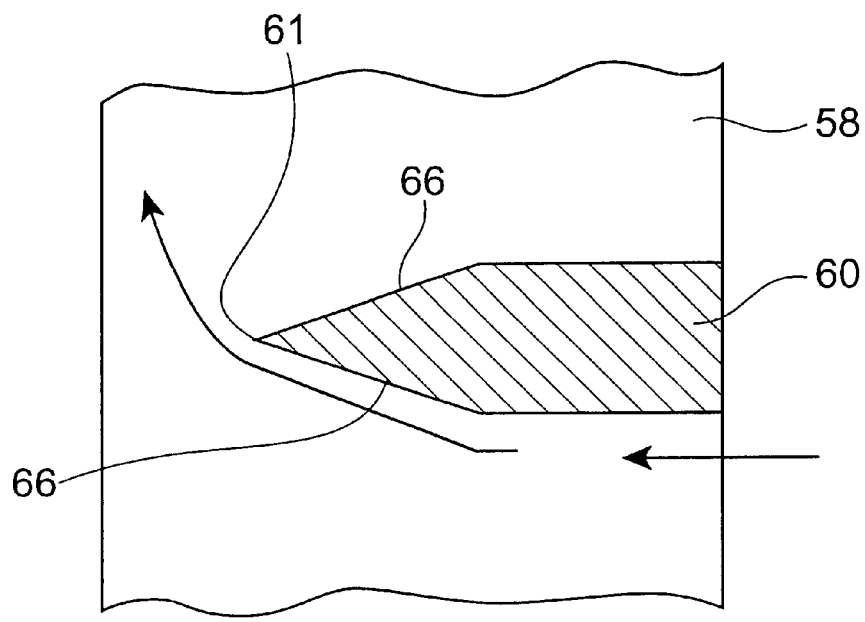
FIG. 6 is a sectional view taken along the line VI—VI of FIG. 3.

As shown in FIG. 6, each radial member 60 is flat, and both sides thereof are parallel to the axis of rotation A of impeller 22. Its trailing edge portion 61 has a slanted surface 66 on both sides, thereby yielding a tapered form.

In the port cover 56 in the depicted embodiment, the width of third ring member 58c, i.e., its size in the direction parallel to the axis of rotation A of impeller 22, is made larger than that of the other ring members 58a, 58b, 58d. Since the leading edge portions of all the ring members 58a to 58d are located on the same plane, the trailing edge portion 59 of third ring member 58c is disposed nearer to the hub plate 30 of impeller 22 than are the trailing edge portions 59 of the other ring members 58a, 58b, 58d.

Figure 5:
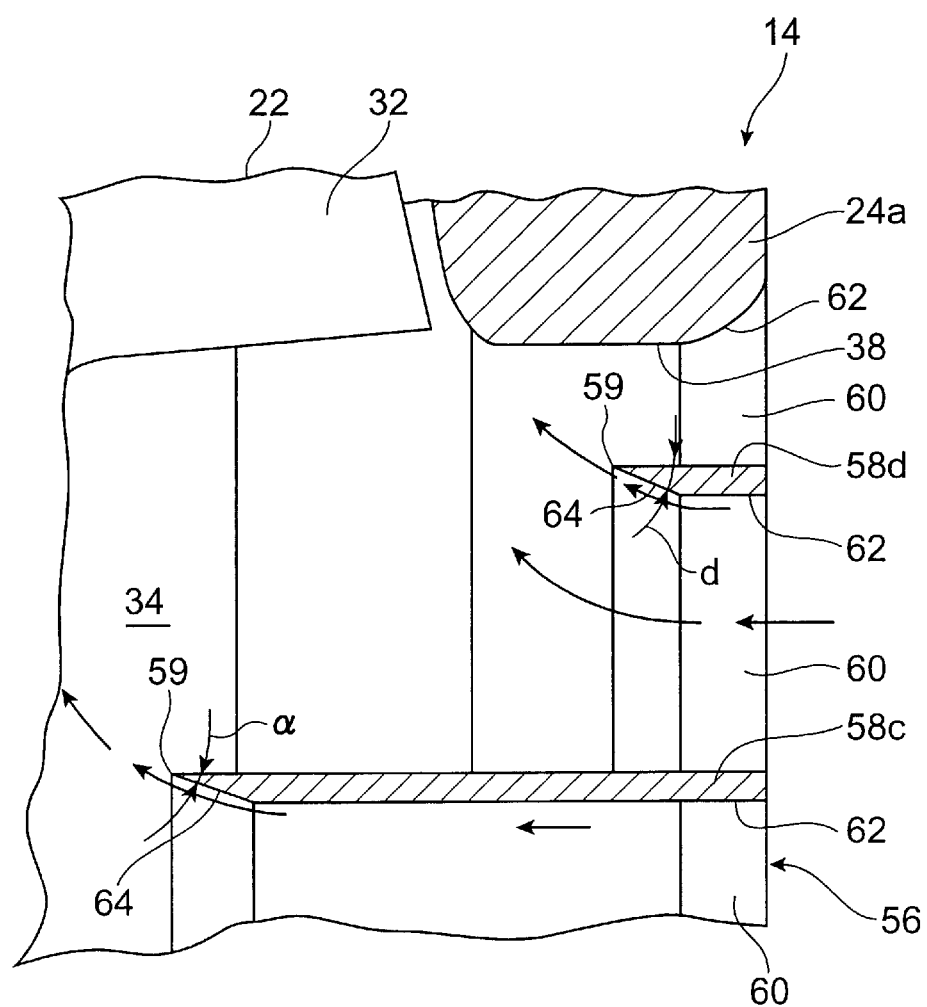
FIG. 5 is a partial view enlarging the part V in FIG. 2.

In such an a configuration, if the internal combustion engine 26 is driven so as to rotate the impeller 22 of centrifugal blower 14, then air passes through the air passing portions 62 of port cover 56 and flows into the air inlet portion 34 of centrifugal blower 14 as indicated by arrows of FIGS. 5 and 6. Here, the air flowing near the inner faces of ring members 58 gradually changes its direction away from the rotation axis A of impeller 22 or radially outward along the slanted surfaces 64 of trailing edge portions 59. If the flow of air near the ring members 58 passes trailing edges 59 of ring members 58, then it is smoothly deflected radially outward from the direction parallel to the rotation axis A of impeller 22, whereby swirls or turbulent flows can be restrained.

Figure 16:
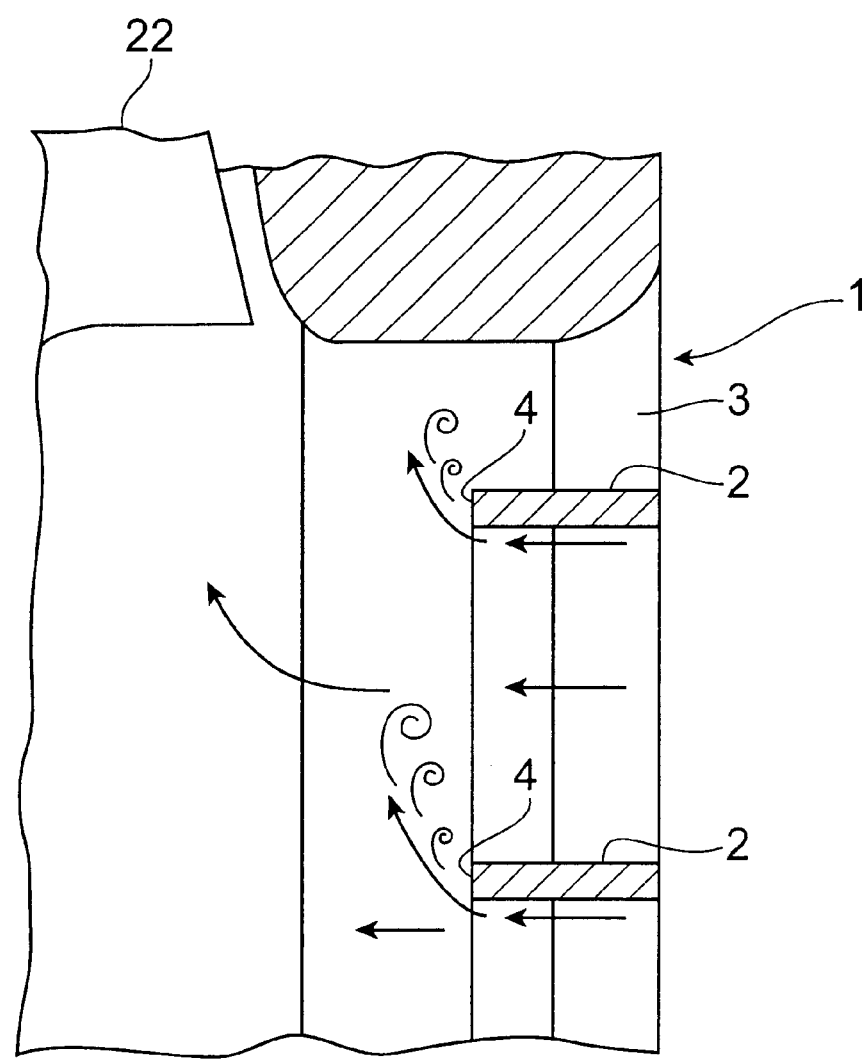
FIG. 16 is a sectional view, similar to FIG. 5, showing a conventional port cover.

In the conventional configuration shown in FIG. 16, the airflow near the ring members 2 has only a component directed along the axis of rotation of impeller 22, so that it drastically changes its direction immediately after passing the trailing edge portions 4 of ring members 2, thereby generating large swirls. In the conventional configuration shown in FIG. 17, rounded portions 8 are very short, so that a flow regulating effect for gradually changing the direction of flow is hardly obtained, whereby large swirls occur as in the configuration of FIG. 16. From such a viewpoint, it will be effective if the angle of inclination $\alpha$ is 10 to 45 degrees in the cross-sectional form of FIG. 5 in order for the slanted surface to exhibit the flow regulating effect.

The air having flowed into the air inlet portion 34 within the centrifugal blower 14 is sent outward while forming a helical flow about the axis of rotation A of impeller 22. The airflow traveling along the radial members 60 has a circumferential component due to the slanted surfaces 66 of trailing edge portions 61 of radial members 60, so that the air having passed the radial members 60 flows smoothly like a helix, whereby swirls are restrained from occurring.

From the viewpoint of noise prevention, in order for the airflow having passed the port cover 56 to keep a laminar flow as much as possible, it is desirable that the air passing the center part of cover 56 flow near the hub plate 30 of impeller 22, and that the air passing the outer peripheral portion of cover 56 flow near the inner wall face of the front-side casing half 24a. This demand will be satisfied where the trailing edge portion 59 of third ring member 58c is projected rearward more than the trailing edge portions 59 of other ring members 58a, 58b, 58d. Thus, the airflow passing the air passing portions 62 surrounded by the third ring portion 58c is sent near the hub plate 30 of impeller 22. On the other hand, the air passing the air passing portions 62 on the outer side of the third ring member 58c flows near the inner wall of the front-side casing half 24a. As a consequence, turbulent flows and swirls can be restrained from occurring in the air inlet portion 34. Also, small swirls occurring downstream the third ring member 58c and small swirls occurring downstream the other ring members 58a, 58b, 58d are prevented from combining together and growing, whereby noise can be suppressed as well.

Figure 7:
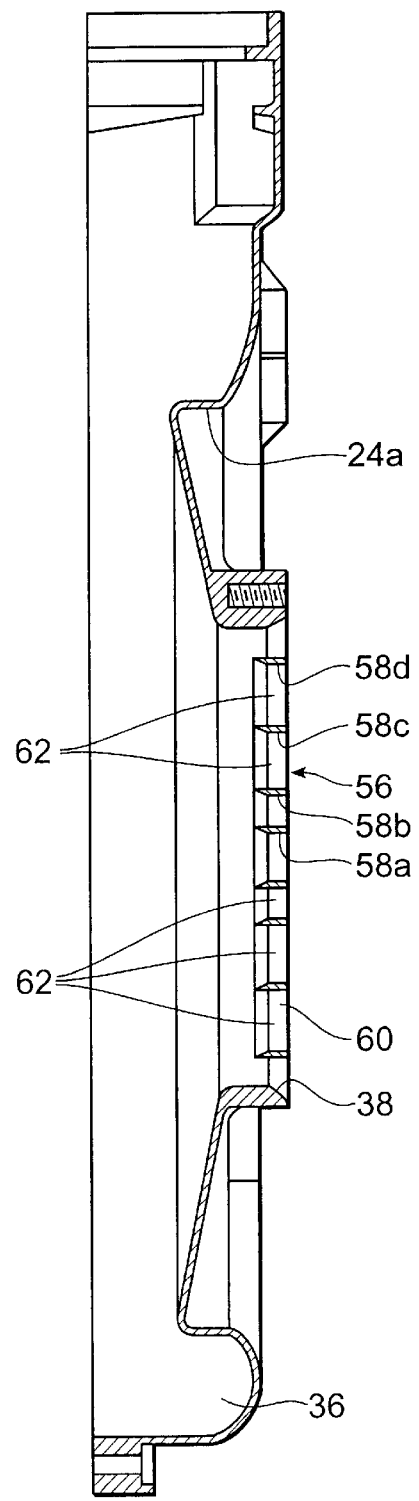
FIG. 7 is a vertical sectional view of a casing half similar to that of FIG. 3, illustrating another embodiment of the present invention.
Figure 17:
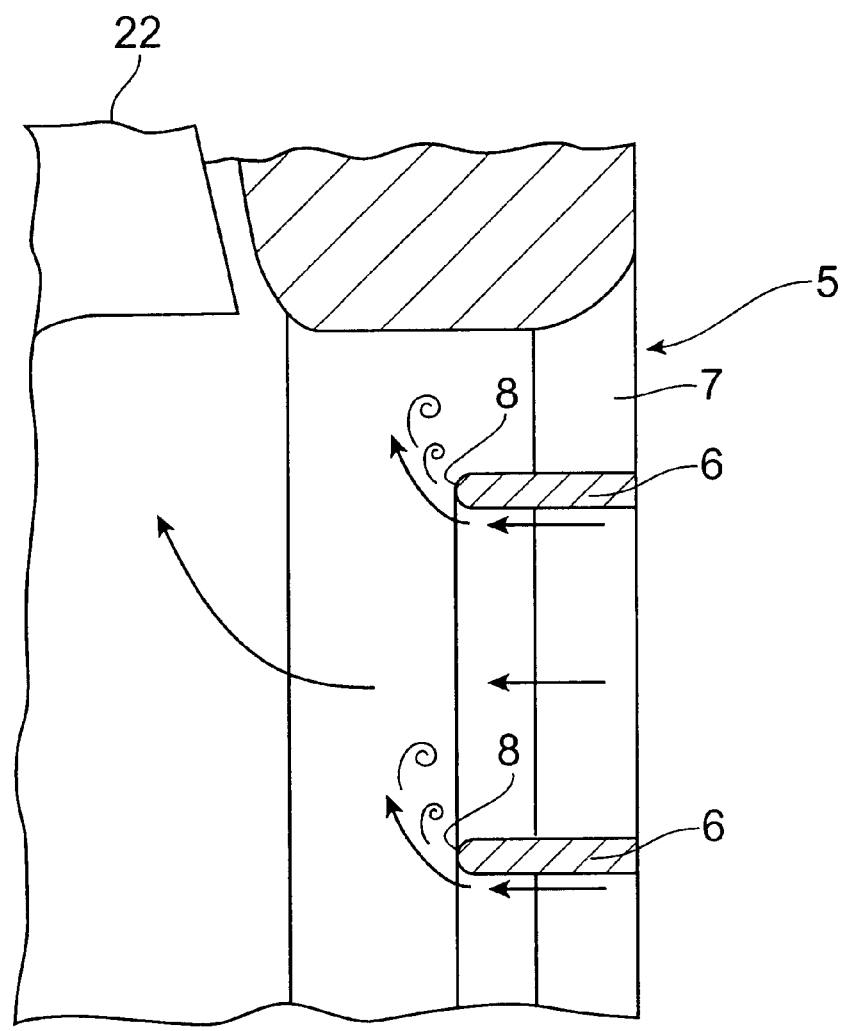
FIG. 17 is a sectional view, similar to FIG. 5, showing another conventional port cover.

Even when the width of third ring member 58c is made identical to that of the other ring members 58a, 58b, 58d as shown in FIG. 7, noise is reduced as compared with the conventional configuration shown in FIG. 16 or 17.

Figure 8:
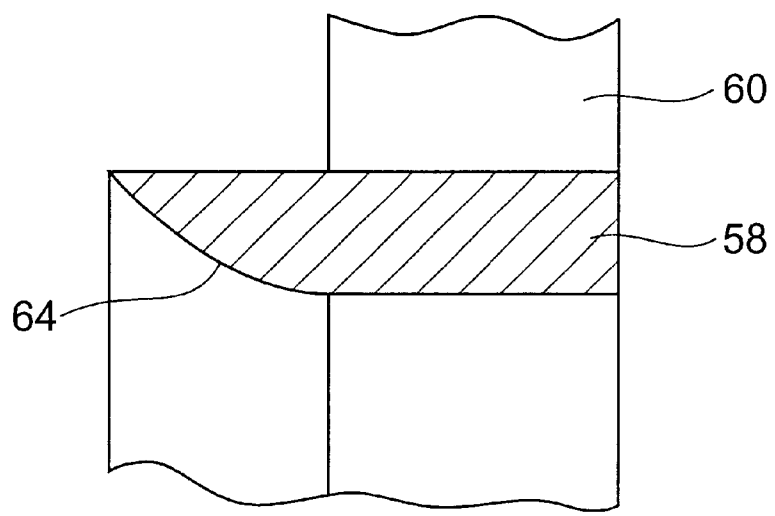
FIGS. 8 to 11 are sectional views showing modified examples of rod-shaped members in a port cover, respectively.
Figure 9:
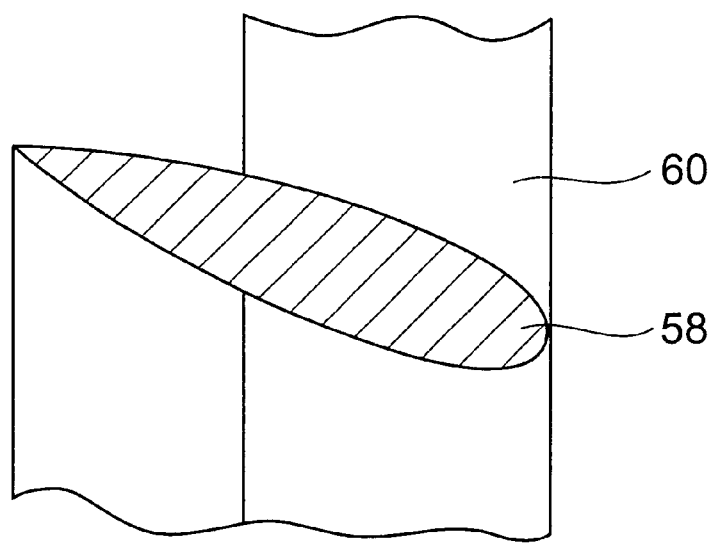
Figure 10:
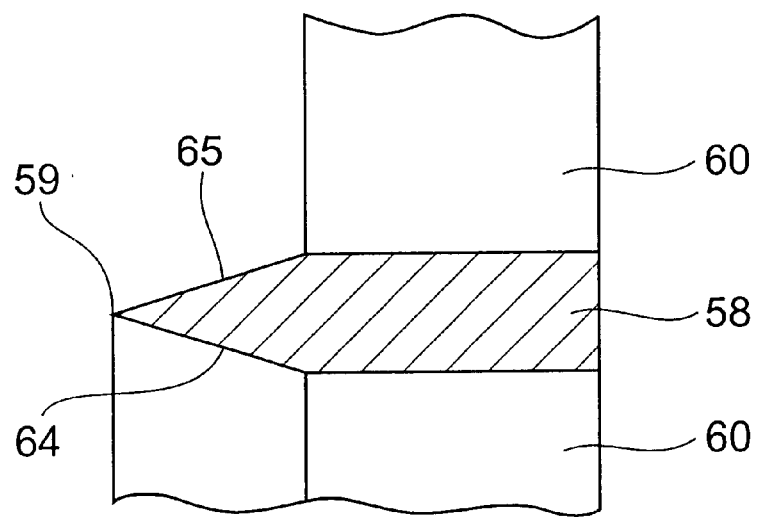

The slanted surface 64 may also be curved into a convex form as shown in FIG. 8. Also, a ring member 58 itself may be widened toward an end as shown in FIG. 9 if swirls can be restrained from occurring due to its flow regulating effect. The ring member 58 of FIG. 9 has a so-called streamlined shape. Further, as shown in FIG. 10, a slanted surface 65 may also be formed on the outer face side of the trailing edge portion 59 of ring member 58.

Figure 11:
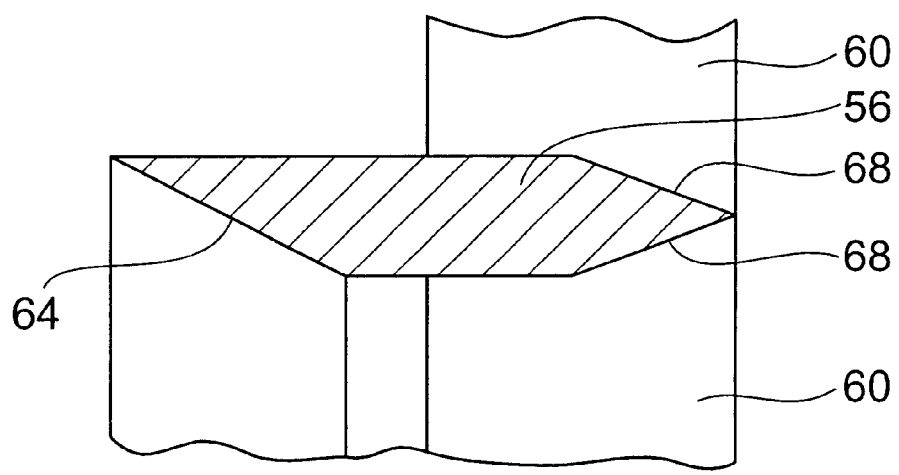

On the other hand, leading edge portions of rod-shaped members 58, 60 may be provided with slanted surfaces 68 as shown in FIG. 11. They are effective in restraining turbulent flows and swirls from occurring when air collides with the leading edge portions of rod-shaped members 58, 60.

It is not necessary for all the rod-shaped members 58, 60 to be formed with slanted surfaces 64, 66. The parts to be slanted may be limited to those where large swirls may occur if not slanted. In the embodiment shown in FIGS. 2 to 5, it has been seen that noise is reduced if only the third ring member 58c is formed with the slanted surface 64. While the port cover 56 may be formed by rod-shaped members which are two-dimensionally combined into a lattice, the trailing edge portions of rod-shaped members where large swirls can occur will be totally or partly formed with a slanted surface as mentioned above in such a configuration.

Figure 12:
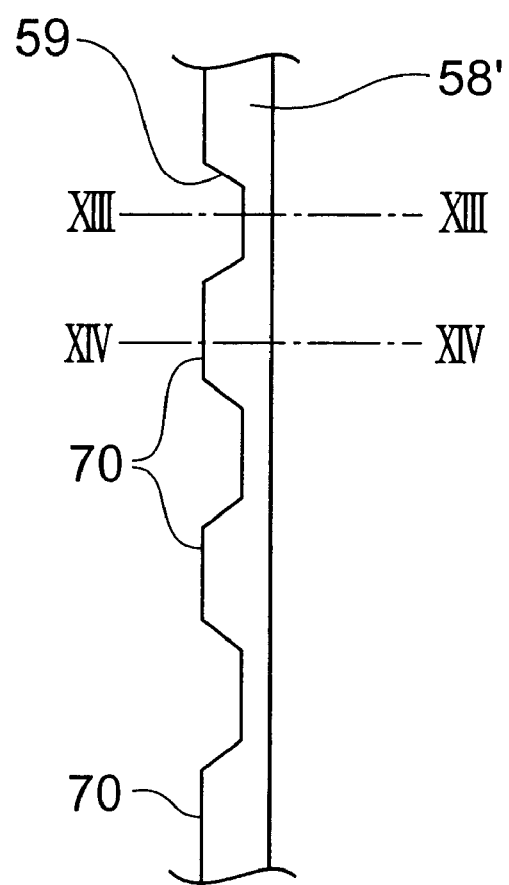
FIG. 12 is a development showing another modified example of rod-shaped member in a port cover.

FIG. 12 shows another embodiment of the present invention, illustrating a development of an annular rod-shaped member 58'. As can be seen from the drawing, this embodiment differs from that shown in FIGS. 2 to 6 only in that rearward projecting parts 70 are formed in the trailing edge portion 59 of rod-shaped member 58' at a predetermined pitch in the extending direction thereof. Though not shown in FIG. 12, radial members can have similar forms.

If the amount of rearward projection, i.e., the amount of downstream projection in the air passing direction, in the trailing edge portion 59 of rod-shaped member 58' is varied in the extending direction of the rod-shaped member, then the trailing edge of rod-shaped member 58' becomes irregular or wavy. In this form, positions of swirls formed immediately after the air passes the rod-shaped member 58' vary. Alternatively, times at which swirls occur shift from each other. Hence, as compared with the case where the trailing edge 59 is linear, swirls disappear sooner without growing, whereby noise is further restrained from occurring. Here, it is not necessary for the irregularities of the trailing edge 59 of rod-shaped member to have a constant pitch.

Figure 13:
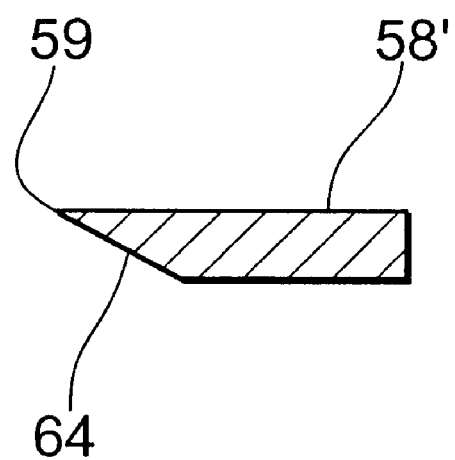
FIG. 13 is an end view taken along the line XIII—XIII of FIG. 12 under magnification.
Figure 14:
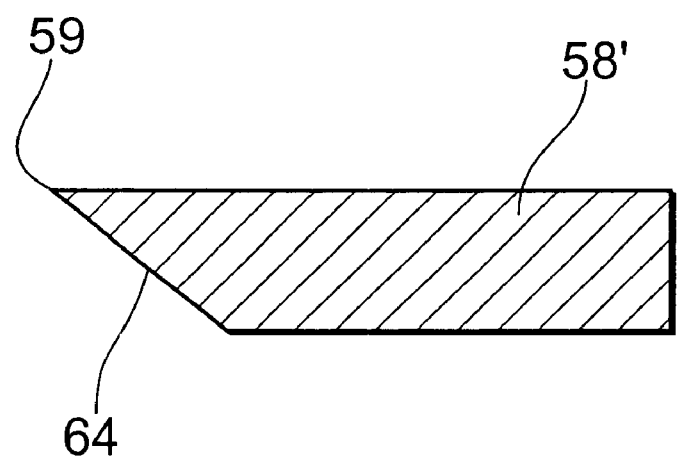
FIG. 14 is an end view taken along the line XIV—XIV of FIG. 12 under the same magnification as FIG. 13.

Also, as can be seen from FIGS. 13 and 14, it will be preferable if the thickness of rod-shaped member 58' varies along the extending direction of the rod-shaped member. Swirls can be restrained from growing in this case as well.

Figure 15:
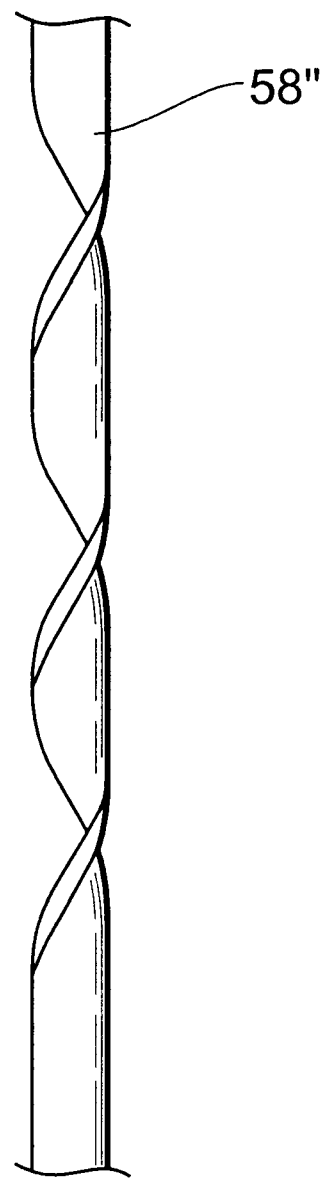
FIG. 15 is a development showing still another modified example of rod-shaped member in a port cover.

The form for changing the amount of projection of leading edge portion along the extending direction of rod-shaped member is not limited to the one shown in FIG. 12. As shown in FIG. 15, a rod-shaped member 58" may be twisted.

Though preferred embodiments of the present invention are explained in detail in the foregoing, the present invention is not restricted to the above-mentioned embodiments as a matter of course.

For example, the port cover may be formed separately from a casing, so as to be attached to the latter by a screw or the like.

The present invention is applicable not only to the backpack blower apparatus, but also to portable power working machines such as backpack power dusters, shoulder-strapped blower apparatus, and shoulder-strapped power dusters.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A centrifugal blower comprising:
    an impeller having a plurality of rotating blades and an air inlet portion surrounded by the plurality of rotating blades;
    a casing for accommodating the impeller, the casing having an intake port disposed at a region opposing the air inlet portion of the impeller; and
    a port cover disposed in the casing for covering the intake port, the port cover comprising a plurality of cylindrical ring members concentrically nested with each other and a plurality of radially extending rod-shaped members connecting the plurality of cylindrical ring members such that the plurality of cylindrical ring members and the plurality of rod-shaped members form a net structure;
    wherein an inner wall of at least one of the plurality of cylindrical ring members facing a rotation axis of the rotating blades is gradually tapered to form a wedge shape at an end of the cylindrical ring member such that air passing through the port cover into the air inlet portion is gradually deflected away from the rotation axis of the rotating blades of the impeller along the inner wall of the cylindrical ring member.

2. The centrifugal blower according to claim 1, wherein inner walls of the plurality of cylindrical ring members facing the rotation axis of the rotation blades are tapered to form a wedge shape at an end of the cylindrical ring members such that air passing through the port cover into the air inlet portion is gradually deflected away from the rotation axis of the rotating blades of the impeller along the end of the cylindrical ring member facing the impeller.

3. The centrifugal blower according to claim 1, wherein a degree of inclination of the taper formed on the inner wall of the cylindrical member is in a range of 10°–45° relative to the rotation axis of the rotating blades.

4. The centrifugal blower according to claim 1, wherein the plurality of rod-shaped members have slanted surfaces such that the rod-shaped members become thinner as they advance in an air passing direction.

5. The centrifugal blower according to claim 1, wherein the plurality of cylindrical ring members of the port cover extend toward the impeller such that distances between the impeller and ends of the plurality of cylindrical ring members facing the impeller are different to each other.

6. The centrifugal blower according to claim 1, wherein a distance between the impeller and an end of one of the plurality of cylindrical ring members facing the impeller is smaller than a distance between the impeller and an end of any other cylindrical ring member.

7. The centrifugal blower according to claim 1, wherein thickness of the plurality of cylindrical ring members is varied in an air passing direction.

8. A portable power working machine having a centrifugal blower, the centrifugal blower comprising:
    an impeller having a plurality of rotating blades and an air inlet portion surrounded by the plurality of rotating blades;
    a casing for accommodating the impeller, the casing having an intake port disposed at a region opposing the air inlet portion of the impeller; and
    a port cover disposed in the casing for covering the intake port, the port cover comprising a plurality of cylindrical ring members concentrically nested with each other and a plurality of radially extending rod-shaped members connecting the plurality of cylindrical ring members such that the plurality of cylindrical ring members and the plurality of rod-shaped members form a net structure;
    wherein an inner wall of at least one of the plurality of cylindrical ring members facing a rotation axis of the rotating blades is tapered to form a wedge shape at an end of the cylindrical ring member facing the impeller such that air passing through the port cover into the air inlet portion is gradually deflected away from the rotation axis of the rotating blades of the impeller along the inner wall of the cylindrical ring member.

9. A backpack blower apparatus having a centrifugal blower, said centrifugal blower comprising:
    an impeller having a plurality of rotating blades and an air inlet portion surrounded by the plurality of rotating blades;
    a casing for accommodating the impeller, the casing having an intake port disposed at a region opposing the air inlet portion of the impeller; and
    a port cover disposed in the casing for covering the intake port, the port cover comprising a plurality of cylindrical ring members concentrically nested with each other and a plurality of radially extending rod-shaped members connecting the plurality of cylindrical ring members such that the plurality of cylindrical ring members and the plurality of rod-shaped members form a net structure;
    wherein an inner wall of at least one of the plurality of cylindrical ring members facing a rotation axis of the rotating blades is tapered to form a wedge shape at an end of the cylindrical ring member such that air passing through the port cover into the air inlet portion is gradually deflected away from the rotation axis of the rotating blades of the impeller along the inner wall of the cylindrical ring member.

10. A centrifugal blower comprising:

an impeller having a plurality of rotating blades and an air inlet portion surrounded by the plurality of rotating blades;

a casing for accommodating the impeller, the casing having an intake port disposed at a region opposing the air inlet portion of the impeller; and a port cover disposed in the casing for covering the intake port, the port cover comprising a plurality of cylindrical ring members concentrically nested with each other and a plurality of radially extending rod-shaped members connecting the plurality of cylindrical ring members such that the plurality of cylindrical ring members and the plurality of rod-shaped members form a net structure;

wherein inner walls of the plurality of cylindrical ring members facing a rotation axis of the rotating blades are gradually tapered to form a wedge shape at ends of the cylindrical ring members facing the impeller, a degree of inclination of the taper being in a range of 10°–45°, such that air passing through the port cover into the air inlet portion is gradually deflected away from the rotation axis of the rotating blades of the impeller along the inner wall of the cylindrical ring member, and a wedge shaped end of one of the plurality of cylindrical ring members is positioned closer to the impeller than a wedge shaped end of any other cylindrical ring member.

* * * * *